(12) United States Patent
Miyazaki

(10) Patent No.: US 8,705,130 B2
(45) Date of Patent: Apr. 22, 2014

(54) IMAGE FORMATION DEVICE

(71) Applicant: Ken Miyazaki, Kanagawa (JP)

(72) Inventor: Ken Miyazaki, Kanagawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 6 days.

(21) Appl. No.: 13/653,449

(22) Filed: Oct. 17, 2012

(65) Prior Publication Data

US 2013/0100467 A1    Apr. 25, 2013

(30) Foreign Application Priority Data

Oct. 20, 2011    (JP) .................................. 2011-230230

(51) Int. Cl.
*G06F 15/00* (2006.01)

(52) U.S. Cl.
USPC ............................. 358/1.9; 358/3.23; 358/519

(58) Field of Classification Search
None
See application file for complete search history.

(56) References Cited

U.S. PATENT DOCUMENTS

| | | | | |
|---|---|---|---|---|
| 6,154,288 | A * | 11/2000 | Watanabe | 358/1.9 |
| 2012/0147397 | A1* | 6/2012 | Kawamoto | 358/1.9 |
| 2013/0250365 | A1* | 9/2013 | Yoshida et al. | 358/3.24 |

FOREIGN PATENT DOCUMENTS

| | | |
|---|---|---|
| JP | 2006-250969 | 9/2006 |
| JP | 2011-103535 | 5/2011 |

* cited by examiner

*Primary Examiner* — Kimberly A Williams
(74) *Attorney, Agent, or Firm* — Lucas & Mercanti, LLP

(57) ABSTRACT

An image formation device includes a printing portion containing a detachable fixer, a fixer identification portion which identifies a type of fixer mounted on the image formation device, a sensor which reads an image printed on a paper by the printing portion, a gamma correction data generating portion which generates gamma correction data by reading a gamma correction chart printed on a paper by the printing portion and stores the generated gamma correction data in a memory medium such that the gamma correction data is associated with a type of the fixer and a type of the paper that are used for printing the gamma correction chart, and printer gamma correction portion which performs printer gamma correction on an image data to be printed based on the gamma correction data stored in the memory medium corresponding to the paper type and the fixer type used for printing.

4 Claims, 18 Drawing Sheets

| LED CHARACTERISTICS | RED LED | GREEN LED | BLUE LED |
|---|---|---|---|
| LUMINOUS INTENSITY(mcd) | 5000-9300 | 1200-21000 | 4200-7200 |
| WAVE LENGTH(nm) | 620-640 | 528-536 | 464-472 |
| DIRECTIONAL CHARACTERISTICS | 15° (±7.5°) | 15° (±7.5°) | 15° (±7.5°) |
| DETECTION OBJECT | C, K | M | Y |

FIG.5

| CLASS | DETAIL | NUMBER OF GAMMA CORRECTION PATCH | NUMBER OF PAPER |
|---|---|---|---|
| LARGE SIZE | (LENGTH IN SUB-SCANNING DIRECTION)≥297.1mm | 32 | 3 |
| MEDIUM SIZE | (LENGTH IN SUB-SCANNING DIRECTION) = 210-297.0mm | 32 | 4 |
| SMALL SIZE | (LENGTH IN SUB-SCANNING DIRECTION) = 176-209.9mm | 32 | 6 |
| NOT APPLICABLE | (LENGTH IN SUB-SCANNING DIRECTION)≤175.9MM OR (LENGTH IN MAIN-SCANNING DIRECTION)≤168MM | - | - |

*FIG. 7*

| | GAMMA CORRECTION DATA |
|---|---|
| 0 | REGISTRATION STATUS (NON-REGISTERED, REGISTERED, READJUSTMENT MODE)<br>FIXER TYPE<br>PAPER CATEGORY NUMBER<br>PAPER TYPE<br>SCREEN<br>COUNTER<br>RENEWAL DATE<br>SENSOR MEASUREMENT VALUE<br>PAST SENSOR MEASUREMENT VALUE |
| 1 | ⋮ |
| 2 | ⋮ |
| ⋮ | ⋮ |
| 14 | ⋮ |

FIG.8

| PAPER CATEGORY ||
|---|---|
| NO. | MEMBER |
| 1 | PAPER CATEGORY NAME |
|   | REGISTRATION STATUS |
|   | FIXER TYPE |
|   | RENEWAL DATE |
|   | DENSITY VALUE |
|   | VOLTAGE VALUE OF PATCH COLOR MEASUREMENT |
| 2 | ″ |
| 3 | ″ |
| ⋮ | ″ |
| 10 | ″ |

FIG. 10

| No. | PAPER CATEGORY NAME | SETTING DATE |
|---|---|---|
| 01 | PAPER TYPE 01 | 2009/08/28 13:42 |
| 02 | PAPER TYPE 02 | 2009/08/31 14:12 |
| 03 | | |
| 04 | PAPER TYPE 04 | 2009/08/31 15:12 |
| 05 | | |
| 06 | | |
| 07 | | |
| 08 | | |
| 09 | | |
| 10 | | |

*FIG.12*

| TRAY PAPER PROFILE | | CONTENT |
|---|---|---|
| TRAY NUMBER | MEMBER | |
| 1 | PAPER TYPE | |
| | PAPER NAME | |
| | WEIGHT UNIT | |
| | UNIT WEIGHT | |
| | PUNCHING YES/NO | |
| | REGISTRATION NUMBER | |
| | FRONT/BACK CHECK ACCURACY | |
| | SIZE SETTING | |
| | AIR BLOW | |
| | PROCESS CONDITIONS SETTING | |
| | PAPER ATTRIBUTE | |
| | LINK TO IRREGULAR SHAPE REGISTRATION DATABASE | |
| | SPEED SETTING | |
| | REGULAR SIZE | |
| | THICKNESS | |
| | CURL INDIVIDUAL CORRECTION SETTING HUMIDIFYING SETTING | DEFAULT CORRECTION VALUES:1 |
| | CURL INDIVIDUAL CORRECTION SETTING CORRECTION DIRECTION SETTING | PAPER CATEGORY:2 |
| | PRINTER GAMMA CORRECTION MODE | OFF:0 |
| | LINK TO PAPER CATEGORY DATABASE | |
| 2 | " | ONE OF REGISTRATION NO. 1 TO 10 OF PAPER CATEGORY |
| 3 | " | |
| . . . | " | |
| 9 | " | |

FIG. 13

ADJUSTMENT

2010/11/16 13:37

OUTPUT PAPER DENSITY ADJUSTMENT
⟨OUTPUT PAPER DENSITY ADJUSTMENT⟩

SETTING CONTENTS CHANGEABLE

OUTPUT PAPER DENSITY ADJUSTMENT

| APPLY OUTPUT PAPER DENSITY ADJUSTMENT | YES | NO |
| --- | --- | --- |
| ADJUSTMENT INTENSITY | 1 2 3 4 5 6 7 8 9 10 | |
| | LOW | HIGH |
| AUTOMATIC ADJUSTMENT | ON | OFF |
| ADJUSTMENT INTERVAL | EVERY 100 SHEETS | CHANGE |
| COORDINATION WITH IMAGE STABILIZING CONTROL | YES | NO |

CANCEL  OK

| SETTING INFORMATION OF OUTPUT PAPER DENSITY ADJUSTMENT ||
|---|---|
| ITEM | SETTING |
| CARRY OUT OUTPUT PAPER DENSITY ADJUSTMENT | YES/NO |
| AUTOMATIC CORRECTION | ON/OFF |
| ADJUSTMENT INTERVAL | 100-99999 |
| ADJUSTMENT INTENSITY | 1-10 |
| IMAGE STABILIZING CONTROL | YES/NO |

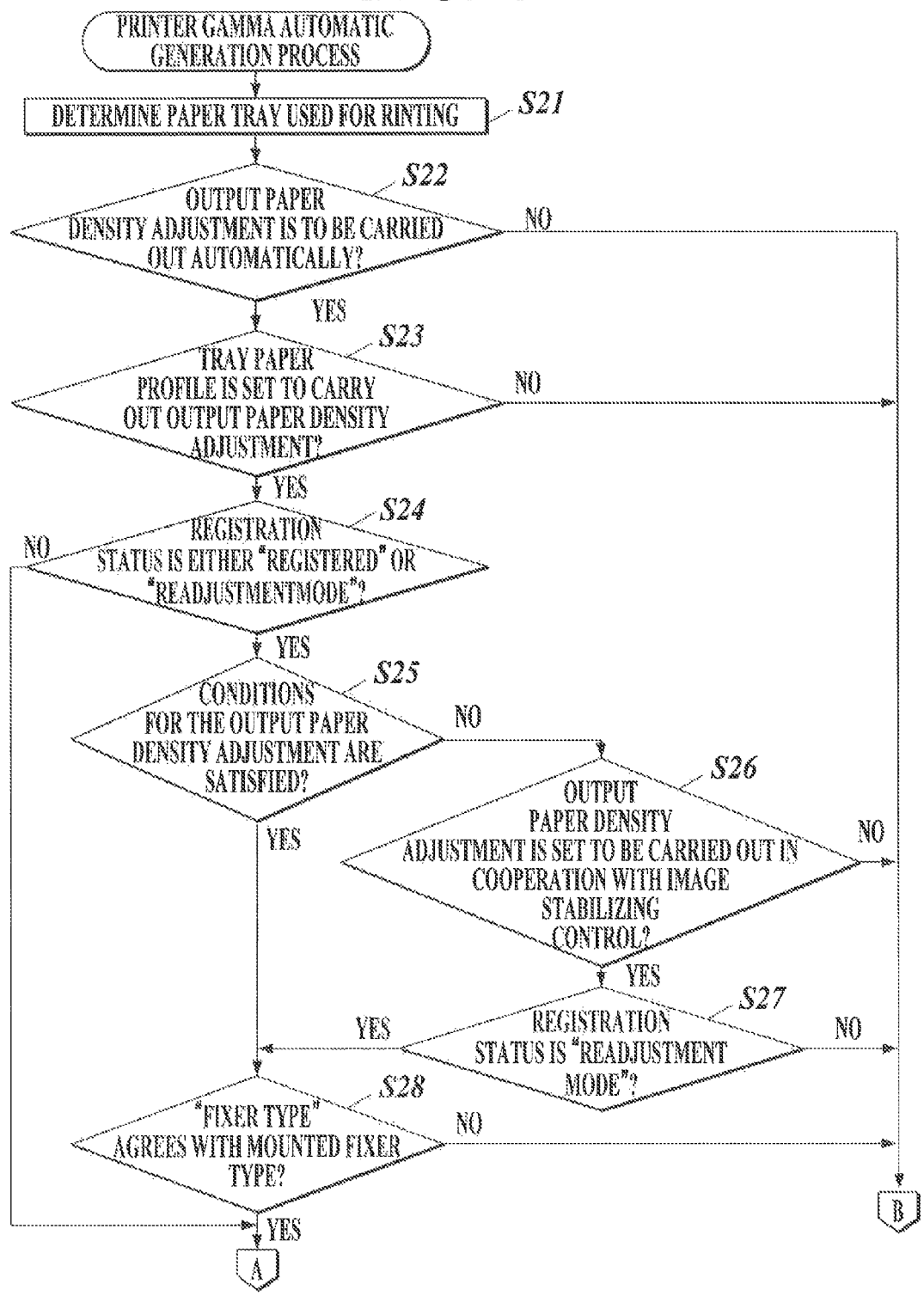

FIG.16

OUTPUT PAPER DENSITY MANUAL ADJUSTMENT

ADJUSTMENT

2010/11/16 13:39

GENERATE OUTPUT PAPER DENSITY MANUAL ADJUSTMENT AT PRINT MODE

REGISTERED OUTPUT PAPER DENSITY MANUAL ADJUSTMENT

| No. | PAPER CATEGORY | REGISTRATION STATUS | PAPER TYPE | SCREEN | SETTING DATE |
|---|---|---|---|---|---|
| 01 | PAPER TYPE 01 | REGISTERED | NORMAL PAPER | DOT190 | 2009/08/28 13:42 |
| 02 | PAPER TYPE 02 | READJUSTMENT | HIGH GRADE PAPER | DOT190 | 2009/08/31 14:12 |
| 03 | | | | | |
| 04 | | | | | |
| 05 | PAPER TYPE 04 | REGISTERED | NORMAL PAPER | DOT190 | 2009/08/31 15:12 |
| 06 | | | | | |
| 07 | | | | | |
| 08 | | | | | |
| 09 | | | | | |
| 10 | | | | | |

1/2  DELETE

PREVIOUS PAGE  NEXT PAGE  TO PRINT MODE  PREVIOUS SCREEN

G4

IMAGE FORMATION DEVICE

BACKGROUND

1. Field of the Invention

The present invention relates to an image formation device.

2. Description of Related Art

A density correction is performed in an image processing by an image formation device so as to reduce an influence of device characteristics of the image formation device and realize color image printing on a paper which are true to an input image. Such a density correction includes a printer gamma correction, for example. The "printer gamma correction" is an adjustment of relative relations between values (input values) of density, luminance and the like of an input image input to an image formation device and density (output values) of an image printed on a paper based on the input image.

Patent Document 1 (JP2011-103535A), for example, discloses a technique to perform a printer gamma correction to an input image data by comparing detected color values of a gamma correction chart printed on a paper obtained by a color sensor, which is provided downstream of a fixer of an image formation device, and original density values of the gamma correction chart. The system using the color sensor can correct characteristics of a paper and process conditions from a transferring process to a fixing process.

In general, gamma correction data is stored to perform a printer gamma correction in an image formation device using a color sensor as disclosed in Patent document 1. The gamma correction data is stored in a form of a density conversion table/function to convert voltage values of the color sensor into density values or density values obtained by reading a gamma correction chart by a color sensor and converting the voltage values into density values using the density conversion table or function. The printer gamma correction is performed using the stored gamma correction data.

Patent Document 2 (JP2006-250969A) discloses a technique to optimize an output image of an image formation device using a process cartridge in which toners, photosensitive material and the like for an image formation process are integrated. In the technique, management information such as property information, of the process cartridge is stored in the process cartridge and the image formation process is controlled based on the management information of the attached process cartridge to use the process cartridge under favorable conditions for the process cartridge.

A type of image formation device is known for which multiple types of fixers (fusers) that are detachably structured can be applied. The gamma correction data used for the printer gamma correction for the color sensor type device above explained includes fixation characteristics. Therefore, in a case where the printer gamma correction is performed in the image formation device of a color sensor type for which multiple types of fixers are detachably structured to optimize output images, the stored gamma correction data has to be totally deleted and new gamma correction data has to be generated every time the fixer is replaced. The replacement causes troublesome work and requires much time.

The problem is not dissolved even when property information and the like of each fixer is stored in the fixer as disclosed in Patent Document 2.

SUMMARY OF THE INVENTION

It is an object of the present invention to provide an image formation device which performs a gamma correction using a color sensor system while it requires no generation of gamma correction data even when a fixer is replaced and to reduce a workload and time for the replacement of the fixer.

To achieve at least one of the objects above explained, an image formation device according to an aspect of the present invention includes a printing portion containing a detachable fixer, a fixer identification portion which identifies a type of fixer mounted on the image formation device, a sensor which reads an image printed on a paper by the printing portion, a gamma correction data generating portion which generates gamma correction data by reading a gamma correction chart printed on a paper by the printing portion and stores the generated gamma correction data in a memory medium such that the gamma correction data is associated with a type of the fixer and a type of the paper that are used for printing the gamma correction chart, and a printer gamma correction portion which performs printer gamma correction on an image data to be printed based on the gamma correction data stored in the memory medium corresponding to the paper type and the fixer type used for printing.

Preferably, the image formation device further includes gamma data generating portion which reads the gamma correction data corresponding to the identified fixer from the memory medium, upon identifying the type of the fixer mounted on the image formation device by the fixer identification portion, and generates gamma data defining a relation between an input image and an output image at the printing portion by utilizing the gamma correction data read from the memory medium. The printer gamma correction portion performs gamma correction on the image data to be printed by utilizing the gamma data generated by the gamma data generating portion based on the gamma correction data corresponding to the paper type and the fixer type used for printing.

Preferably, the image formation device further includes a display portion and a display controlling portion which controls to display a list of the gamma correction data stored in the memory medium on the display portion. The display controlling portion controls such that the gamma correction data corresponding to a fixer type that is different from a fixer type of the fixer that is presently mounted on the image formation device is shaded or not displayed in the list.

BRIEF EXPLANATION OF DRAWINGS

The present invention will become more fully understood from the detailed description given hereinbelow and the accompanying drawings which are given by way of illustration only, and thus are not intended as a definition of the limits of the present invention, and wherein;

FIG. 5 is a size specification of a gamma correction chart, FIG. 7 shows an example of a data structure of a gamma correction data, FIG. 8 shows an example of a data structure of a paper category, FIG. 10 shows an example of a listing screen of a paper category, FIG. 12 is an example of a data structure of a paper tray profile, FIG. 13 shows an example of an output paper density adjustment setup screen, FIG. 14 shows an example of setting information of output paper density adjustment, FIG. 15A is a flowchart of an automatic generation process of a printer gamma performed by the controlling portion in FIG. 2

FIG. 16 shows an example of an output paper density adjustment setup screen.

DETAILED DESCRIPTION OF THE PREFERRED EMBODIMENTS

A structure and operation of an image formation device according to an exemplary embodiment of the present invention will be explained in detail with reference to the drawings. A color image formation device is exemplified; however, the present invention is not limited to it but the present invention can be applied to a monochrome image formation device.
(Structure of an Image Formation Device 10)

Figure 1:
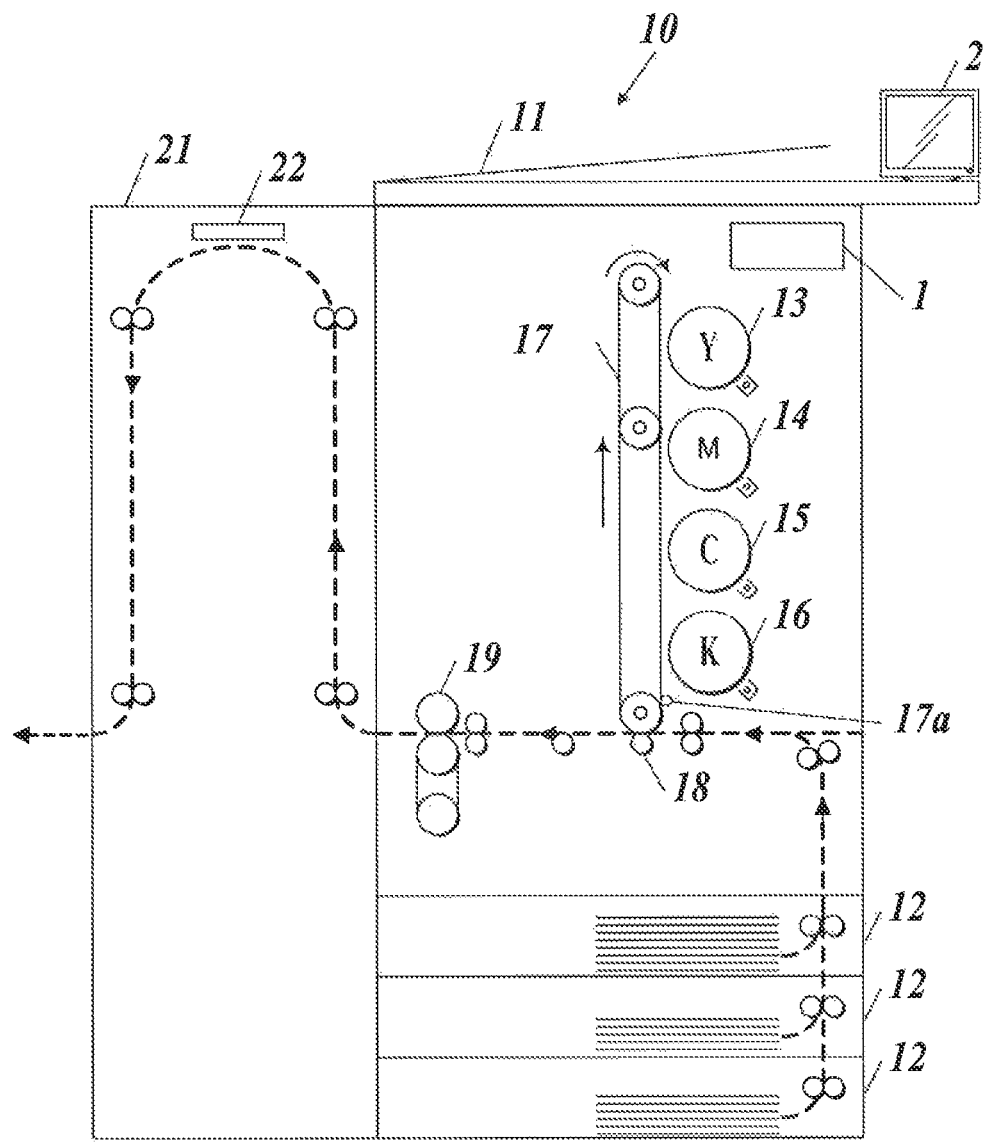
FIG. 1 is a schematic structure of an image formation device of an exemplary embodiment of the invention.
Figure 2:
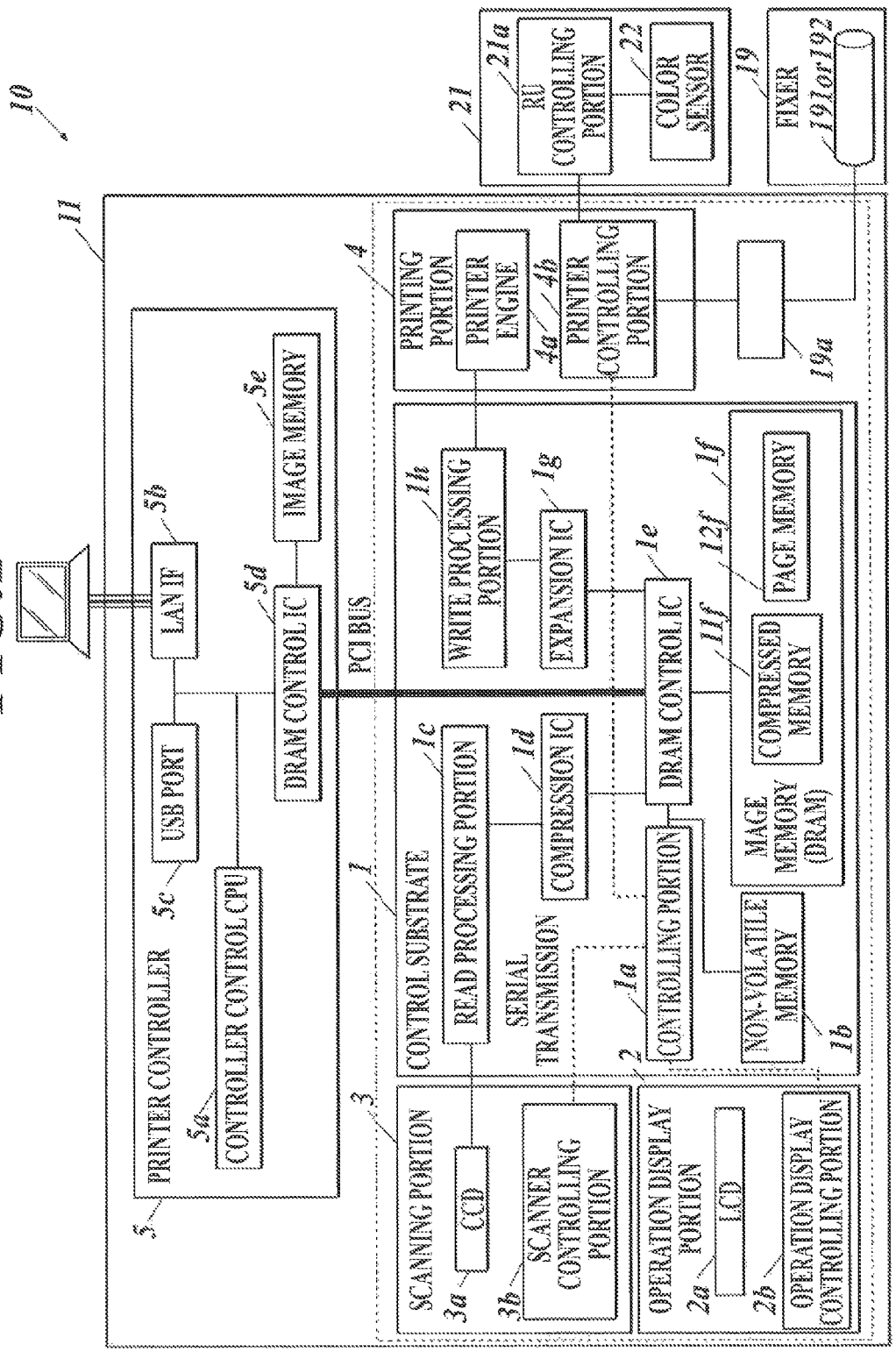
FIG. 2 is a functional block diagram of the image formation device.

FIG. 1 shows a schematic structure of an image formation device 10 according to an exemplary embodiment of the present invention and FIG. 2 is a functional block diagram of the image formation device 10.

The image formation device 10 is an electrophotographic digital printer and provided with a main portion 11 and a relay unit (designated as "RU" hereinafter) 21.

The main portion 11 is composed of a control substrate 1, operation display portion 2, scanning portion 3, printing portion 4, printer controller 5, and the like. Each portion is supplied with electric power from a power portion (not shown).

The control substrate 1 is composed of a controlling portion 1a, non-volatile memory 1b, read processing portion 1c, compression IC 1d, DRAM control IC 1e, image memory 1f, expansion IC 1g, write processing portion 1h, and the like.

The controlling portion 1a is composed of a CPU, RAM, ROM, and the like and reads various kinds of programs stored in the ROM or the non-volatile memory 1b, develops the read programs in the RAM and performs various processing in collaboration with the programs so as to control each portion of the image formation device 10. For example, the controlling portion 1a functions as a gamma correction data generating portion, printer gamma correction portion, gamma data generating means and display control portion by controlling each portion of the image formation device 10 in collaboration with the programs.

The non-volatile memory 1b is a memory medium composed of a rewritable non-volatile memory to store various programs and data.

Figure 3:
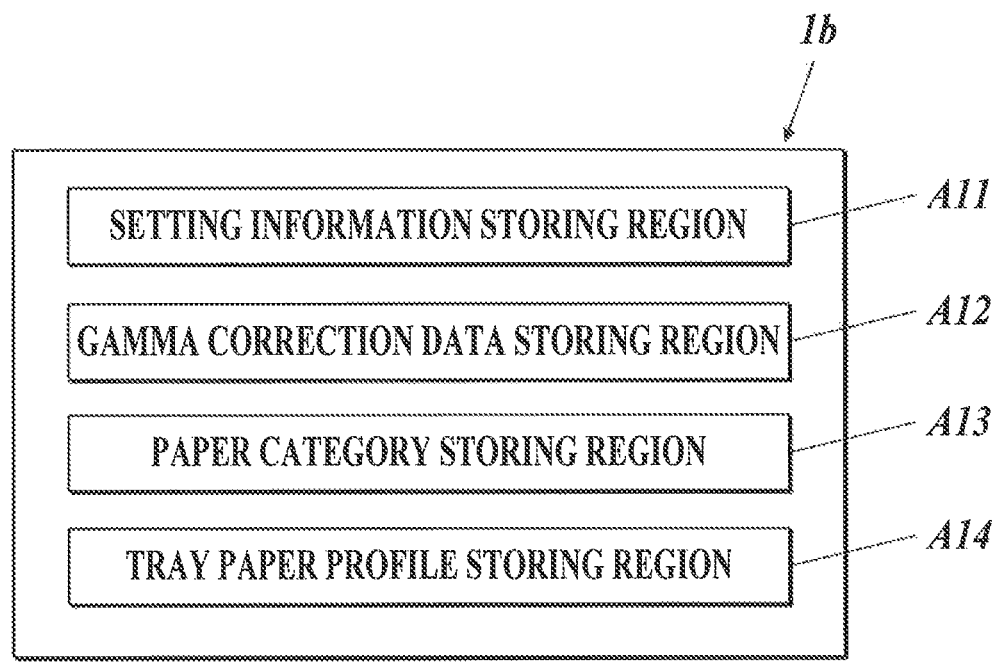
FIG. 3 is a data storing structure in a non-volatile memory.

In this embodiment, the non-volatile memory 1b includes, as shown in FIG. 3, a setting information storing region A11, gamma correction data storing region A12, paper category storing region A13, tray paper profile storing region A14, and the like as data storing regions for output paper density adjustment which will be explained later.

The non-volatile memory 1b also stores image data of a gamma correction chart, size specification, default correction values, gamma correction data by an IDC sensor, and the like, which will be explained later. The non-volatile memory 1b includes a total counter which stores the number of total prints by the printing portion 4.

Analog image signals output from a CCD 3a are input to the read processing portion 1c and the read processing portion 1c generates digital image signals by performing analog processing, shading processing, A/D conversion, and the like to the input analog image signals. The read processing portion is outputs the generated image data to the compression IC 1d.

The image data output from the read processing portion 1e is input to the compression IC 1d and the compression IC 1d performs compression processing to the input image data and outputs the compressed image data to the DRAM control IC 1e.

The DRAM control IC 1e controls the compression IC 1d to compress the image data read by the read processing portion 1c and stores the compressed image data in a compressed memory 11f.

The DRAM control IC 1e controls the expansion IC 1g to receive the compressed image data from the compressed memory 11f, expands the compressed image data and stores the expanded (non-compressed) image data in a page memory 12f. The DRAM control IC 1e receives the non-compressed image data stored in the page memory 12f and outputs the input non-compressed image data to the write processing portion 1h.

The image memory 1f is composed of DRAM and is provided with the compressed memory 11f and the page memory 12f. The compressed memory 11f stores compressed image data. The page memory 12f stores non-compressed image data to be printed temporally before printing.

The expansion IC 1g performs expansion processing to the input compressed image data.

The write processing portion 1h generates print data based on the image data to be printed input from the DRAM control IC 1e and outputs to the printing portion 4.

The operation display portion 2 is composed of a LCD (Liquid Crystal Display) 2a, operation display controlling portion 2b, and the like.

The LCD 2a is provided with a touch panel that covers the LCD 2a. The operation display controlling portion 2b receives display signals output from the controlling portion 1a and displays various setup screens and the like on the LCD 2a based on the input display signals. The operation display controlling portion 2b also receives operation signals generated by pressing down operation keys or touch panel (both not shown) and outputs the input operation signals to the controlling portion 1a.

The scanning portion 3 is provided with a CCD 3a and a scanner controlling portion 3b that drives/controls the CCD 3a. The scanning portion 3 scans and exposes a manuscript on a manuscript stage (not shown) with a light source, receives the reflected light from the manuscript and opto-electronically transduces the reflected light to generate analog image signals using the CCD 3a. The scanning portion 3 reads the generated analog image signals and outputs to the read processing portion 1c.

The printing portion 4 is a printing portion composed of a printer engine 4a and printer controlling portion 4b that controls image formation operation of the printer engine 4a.

The printer engine 4a is composed of a paper feed portion 12, photoconductor drums 13-16, intermediate transfer belt 17, transfer roller 18, fixer 19, and the like, and executes image formation process to form a toner image on a paper and fix the toner image. An IDC sensor 17a is provided downstream of the intermediate transfer belt 17 in a rolling direction.

The paper feed portion 12 is composed of a plurality of paper trays and receives different kinds of papers for supplying the paper through a predetermined feeding path.

The photoconductor drums 13-16 each forms and holds a toner image of each color of YMCK on the drum and transfer them on the intermediate transfer belt 17 (primary transfer).

The intermediate transfer belt 17 rotates while holding the transferred toner images.

The transfer roller 18 transfers the toner images of YMCK colors held on the intermediate transfer belt 17 on a paper (secondary transfer).

The fixer 19 fixes the toner images of YMCK colors transferred and formed on a paper by heating or pressing. The paper on which the toner images are fixed is conveyed to the RU21.

The fixer 19 is structured so as to be detachable from the main portion 11 of the image formation device 10. There are two types of fixers, a normal fixer 191 and a special fixer 192, and one of which is mounted (attached) on the main portion 11. In this embodiment, the normal fixer 191 is for printing on a paper other than envelope. The special fixer 192 is used as an envelope fixer for printing on envelopes only. The special fixer 192 is structured for printing on envelopes only such that the fixing roller is made slim so as to prevent an envelope to get creased easily, for example. As a result, when the special fixer 192 is used for fixing papers other than envelope, it causes damage of the fixer as well as causes high costs. Therefore, the special fixer 192 is used for fixing on envelope only and the normal fixer 191 is used for other papers.

A mounting portion for mounting the fixer 19 on the main portion 11 is provided with a port 19a as a fixer identification portion for identifying a type of the mounted fixer 19. For example, when the normal fixer 191 is mounted, a "HIGH" signal as a fixer identification signal is output to the printer controlling portion 4b through the port 19a. When the special fixer 192 is mounted, a "LOW" signal as a fixer identification signal is output to the printer controlling portion 4b through the port 19a. The printer controlling portion 4b can identify the fixer mounted on the image formation device 10 based on the fixer identification signal.

The image density control (IDC) sensor 17a is provided downstream of the intermediate transfer belt 17 in a rolling direction. The IDC sensor 17a reads the gamma correction chart formed on the intermediate transfer belt 17 and outputs obtained voltage values to the controlling portion 1a.

The printer controller 5 is structured by a controller controlling CPU 5a, LAN IF 5b, USE port 5c, DRAM control IC 5d and image memory 5e.

The controller controlling CPU 5a controls each portion of the printer controller 5.

The LAN IF 5b is a communication interface to connect with a LAN such as an NIC or modem and receives image data transmitted from outside PC through the LAN. The LAN IF 5b outputs the received image data to the DRAM control IC 5d.

The various kinds of data stored in the USB memory is input to the USB port 5c and the input data is output to the controller controlling CPU 5a.

The DRAM control IC 5d outputs image data to the image memory 5e and receives image data from the image memory 5e. The DRAM control IC 5d is connected with a DRAM control IC 1e in the control substrate 1 by a PCI bus and outputs image data or various data to the DRAM control IC 1e.

The RU 21 is composed of a RU controlling portion 21a, a color sensor 22, and the like. The RU 21 has a function to synchronize with a feed speed of a paper fed from the main portion 11. The RU 21 may have a finishing function such as a punching process, folding process, adhesive spreading process, cutting process, or the like.

The RU controlling portion 21a is composed of a CPU, RAM, ROM and the like and reads programs stored in the ROM, develops in the RAM and controls each portion of the RU 21 in cooperation with the developed programs. The RU controlling portion 21a is connected with the controlling portion 1a of the control substrate 1 so as to transfer data through the printer controlling portion 4b.

Figure 4:
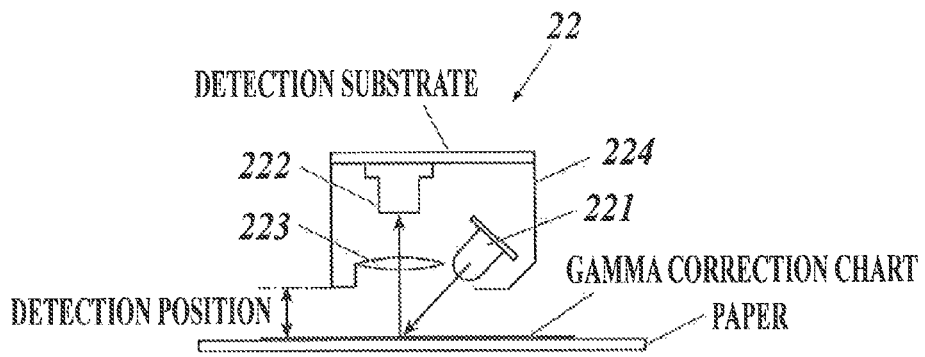
FIG. 4 is a schematic structural drawing of a color sensor.

The color sensor 22 is a reflect-type sensor composed of a LED light source 221, photoreceptor 222, lens 223, lens holder 224 and the like as shown in FIG. 4. The color sensor 22 reads the gamma correction chart (see FIG. 6) formed on a paper which passes over the sensor and outputs obtained voltage values to the RU controlling portion 21a.

(Printer Gamma Correction)

The image formation device 10 is provided with the IDC sensor 17a and the color sensor 22, as explained above, and can perform the printer gamma correction by two methods, one is using the IDC sensor and the other is the color sensor.

The IDC sensor method is a method for correcting transfer characteristics at the printing portion 4. According to the IDC sensor method, the gamma correction chart for the IDC sensor is formed on the intermediate transfer belt 17, the colors of the chart are determined by the IDC sensor 17a to generate gamma correction data and the printer gamma correction is performed at printing as a job based on the gamma correction data. The image formation device 10 generates five kinds of gamma correction data in accordance with screens.

The color sensor method is a method for correcting transfer to fixation characteristics at the printing portion 4. The color sensor method also performs correction based on paper characteristics. According to the color sensor method, gamma correction chart (see FIG. 6) is formed on a paper at the printing portion 4, the color is determined by the color sensor 22 of the RU 21 to generate gamma correction data and the printer gamma correction is performs at the image formation based on the gamma correction data. The image formation device 10 generates fifteen (15) gamma correction data in accordance with combinations of a fixer, a screen and a paper (normal paper, high grade paper or coated paper). It is designated as an output paper density adjustment to generate the gamma correction data using the color sensor 22. The output paper density adjustment will be explained in detail.

FIG. 5 is a size specification of a gamma correction chart used for the output paper density adjustment.

It is assumed that a setting of the size specification of a gamma correction chart for the output paper density adjustment is stored in the non-volatile memory 1b. The gamma correction chart is composed of multiple gamma correction patches and the gamma correction patches are formed in multiple papers. The size of the gamma correction patch is determined based on the capability of the color sensor 22 and the like. Generally, the larger the paper size becomes, the less number of papers are necessary for the gamma correction chart and the smaller the paper size becomes, the more number of papers are necessary. In this embodiment three paper sizes (large, medium and small) are set and corresponding number of papers which are necessary for the gamma correction chart are set. For example, when forming gamma correction chart on a paper having a length of 297.0 mm (A4 size) in a sub-scanning direction (paper feed direction), it corresponds to "medium size" and thus the "number of patches for gamma correction" is 32 and the "number of papers" is four.

Figure 6:
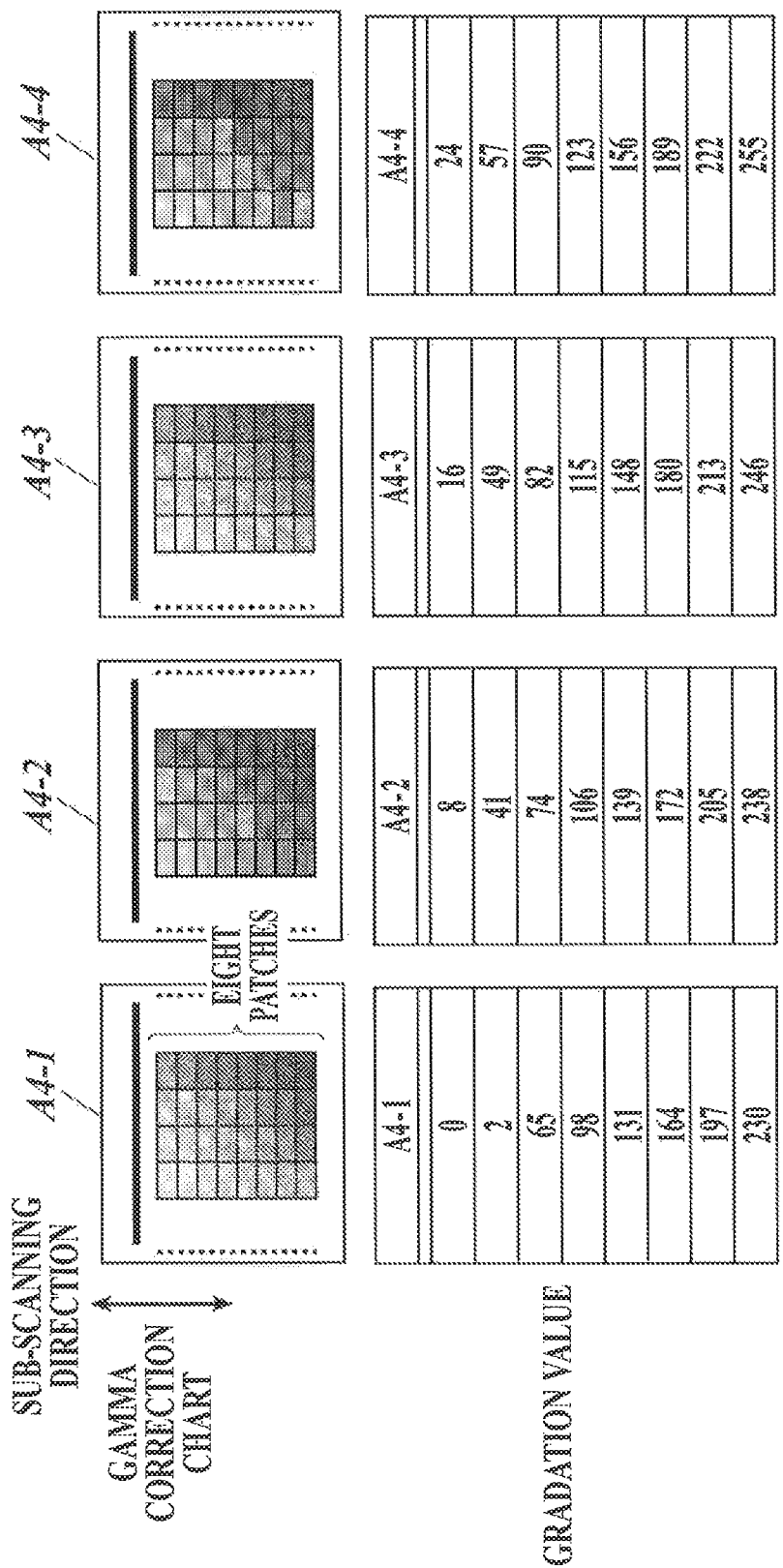
FIG. 6 shows an example of a gamma correction chart.

FIG. 6 shows an example of a gamma correction chart used for the output paper density adjustment.

The gamma correction charts shown in FIG. 6 are formed on papers of A4 size. Gamma correction patches for each of Y, M, C and K colors are formed on four papers of A4-1 to A4-4.

There are eight gamma correction patches in one A4 paper and 32 patches are formed in total in four A4 papers. Therefore, the total number of the gamma correction patches for Y, M, C and K colors is 128. Gradation values of the gamma correction patches formed on the gamma correction charts A4-1 to A4-4, as can be seen in FIG. 6, are scattered equally in the charts A4-1 to A4-4, with the maximum gradation value of 255. The scattering of the density contributes to keep reproducibility of colors and reduce the chart dependence or noises.

FIG. 7 is an example of a data structure of gamma correction data generated by the output paper density adjustment of this embodiment. The gamma correction data includes measured values (density values) of the gamma correction chart read by the color sensor 22 and is used for generating gamma data (a gamma correction table or equation defining a relation between the input image and the output image at the printer engine 4a). The gamma correction data is composed of items such as a "registration status", "fixer type", "paper category number", "paper type", "screen", "counter", "renewal date", "sensor measurement value", "past sensor measurement value" and the like, as shown in FIG. 7.

The item "registration status" stores one of the registration statuses of "not-registered", "registered" and "readjustment mode". The "not-registered" means that the sensor measurement values are not registered. The "registered" status means that the sensor measurement values are registered. The "readjustment mode" means that sensor measurement values have to be regenerated because an image stabilizing control is performed.

The "fixer type" stores information indicating a type of fixer (normal fixer: 0, special fixer: 1) used for printing the gamma correction chart to obtain the "sensor measurement value". The type of fixer is classified by a group having the same purpose or usage.

The "paper category number" stores a registration number of a paper category (sensor correction data of the color sensor 22) used for converting voltage values output by the color sensor 22 into density values. The paper category will be explained in detail later.

The "paper type" stores information relating to a kind of paper used for printing the gamma correction chart to obtain the "sensor measurement value".

The "screen" stores information relating to a type of screen used for printing the gamma correction chart to obtain the "sensor measurement value".

The "counter" stores information indicating total counter (the number of prints) of the image formation device at the point of time the sensor measurement value is registered.

The "renewal date" stores a date the gamma correction data is updated.

The "sensor measurement value" stores density values which are obtained by converting the voltage values obtained by measurement of the gamma correction chart by the color sensor 22 at the output paper density adjustment. The "past sensor measurement value" stores sensor measurement values before renewal. The gamma data used for the printer gamma correction is generated using the sensor measurement values.

The gamma correction data is stored in the gamma correction data storing region A12 of the non-volatile memory 1b.

The paper category will be explained here.

The output paper density adjustment is performed by reading the gamma correction chart formed on a paper by the color sensor 22. A reflection rate of the color sensor 22 differs according to the types of papers. Therefore, it is necessary to correct altered reading characteristics of the color sensor 22, for every type of papers, caused by a replacement of the color sensor or differences of the sensor itself such as a position shifting, for example, to obtain images of stable quality. For this reason, a gamma correction chart formed on a paper fed from the paper feed portion 12 is read by the color sensor 22 to obtain voltage values and the gamma correction chart is read by a color measurement device, for example, to obtain density values such as XYZ tristimulus values so as to perform the sensor characteristics correction. The obtained voltage values and density values are stored in the paper category storing region A13 of the non-volatile memory 1b as the sensor correction data. The sensor correction data is called as the "paper category" because the data depends on a type of paper. A density conversion table or function for converting the voltage values of a sensor into the density values is created based on the paper category and the gamma correction data is generated using the density conversion table or function.

FIG. 8 is an example of a data structure of the paper category. The paper category, as shown in FIG. 8, includes a "voltage value of detected patch color" which is obtained by reading the gamma correction chart formed on a paper with the color sensor 22, "density value" such as a XYZ tristimulus value which is obtained by reading the gamma correction chart with a color measurement device, for example, and "type of fixer" which indicates a fixer type (normal fixer: 0, special fixer: 1) which is mounted at the time of output of the gamma correction chart. Ten (10) paper categories of No. 1 to No. 10, for example, can be registered in the paper category storing region A13. The characteristics of the color sensor 22 can be corrected by creating the density conversion table or function that defines a relation between the voltage values output from the color sensor 22 and the density values such as the tristimulus values based on the paper category.

The non-volatile memory 1b stores default sensor correction data (designated as default correction values) and the default correction values may be used for the printer gamma correction.

The paper category and the default correction values are associated with (linked to) setting of the tray paper of each paper tray. At a time of the output paper density adjustment, gamma correction data is generated using the paper category or the default correction values that are associated with (linked to) the tray paper setting of a paper tray in which the paper for the output paper density adjustment is set.

Figure 9:
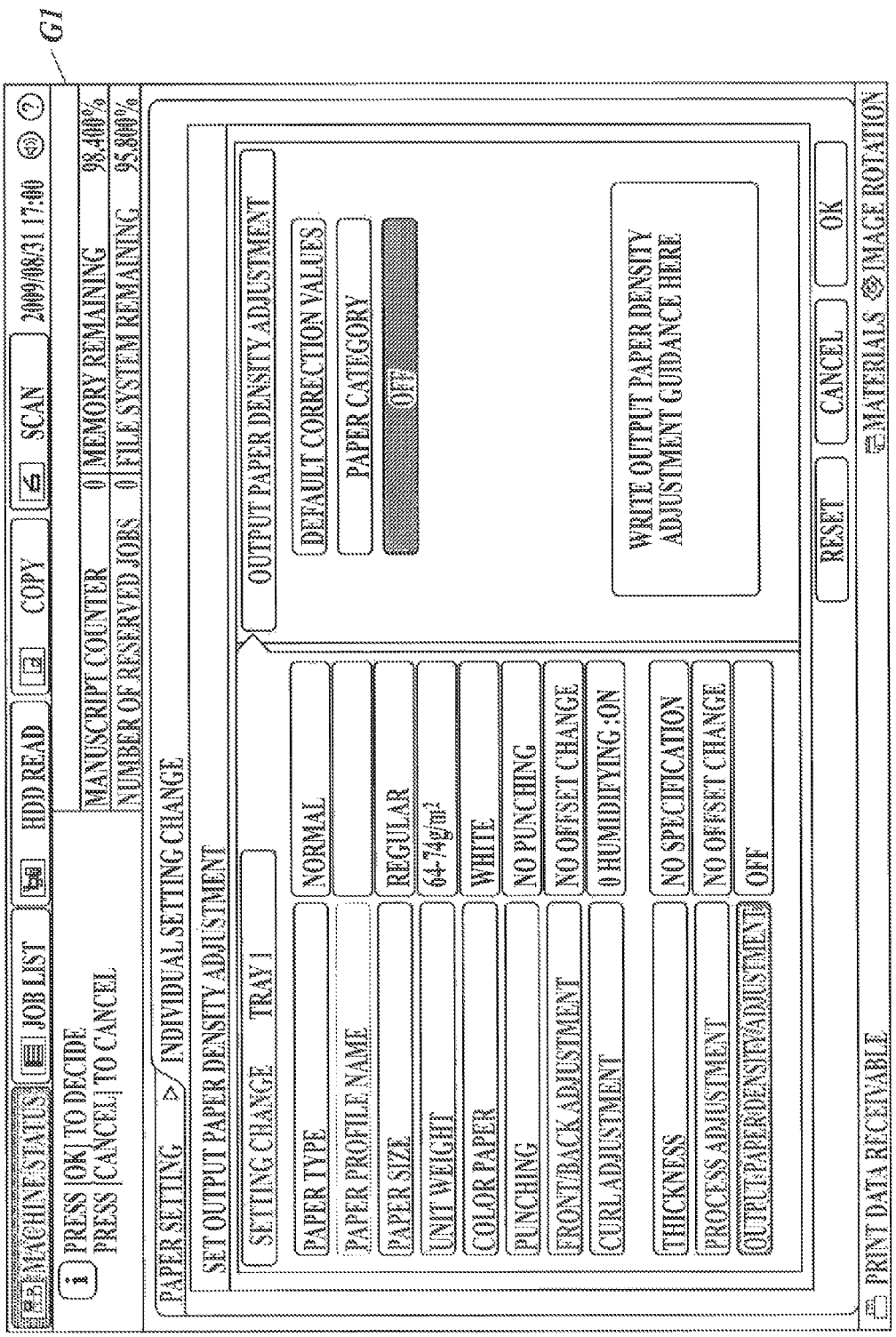
FIG. 9 shows an example of an individual setup screen.

The linking of the paper category or the default correction values to the setting of tray paper of each paper tray can be established by an individual setup screen G1 for each tray as shown in FIG. 9, for example. Specifically, the individual setup screen G1 is displayed on the LCD 2a of the operation display portion 2. When an "output paper density adjustment" button is pressed, a "default correction values" button, "paper category" button and "OFF" button are displayed on the right side of the screen. When the "default correction values" button is pressed, the default correction values are linked to a paper set in a target tray. When the "paper category" button is pressed, a listing screen G2 of registered paper categories is displayed as shown in FIG. 10 and a selected paper category is linked to a paper set in a tray upon selection from the list. When the "OFF" button is pressed, the gamma correction by the IDC sensor is linked.

Figure 11:
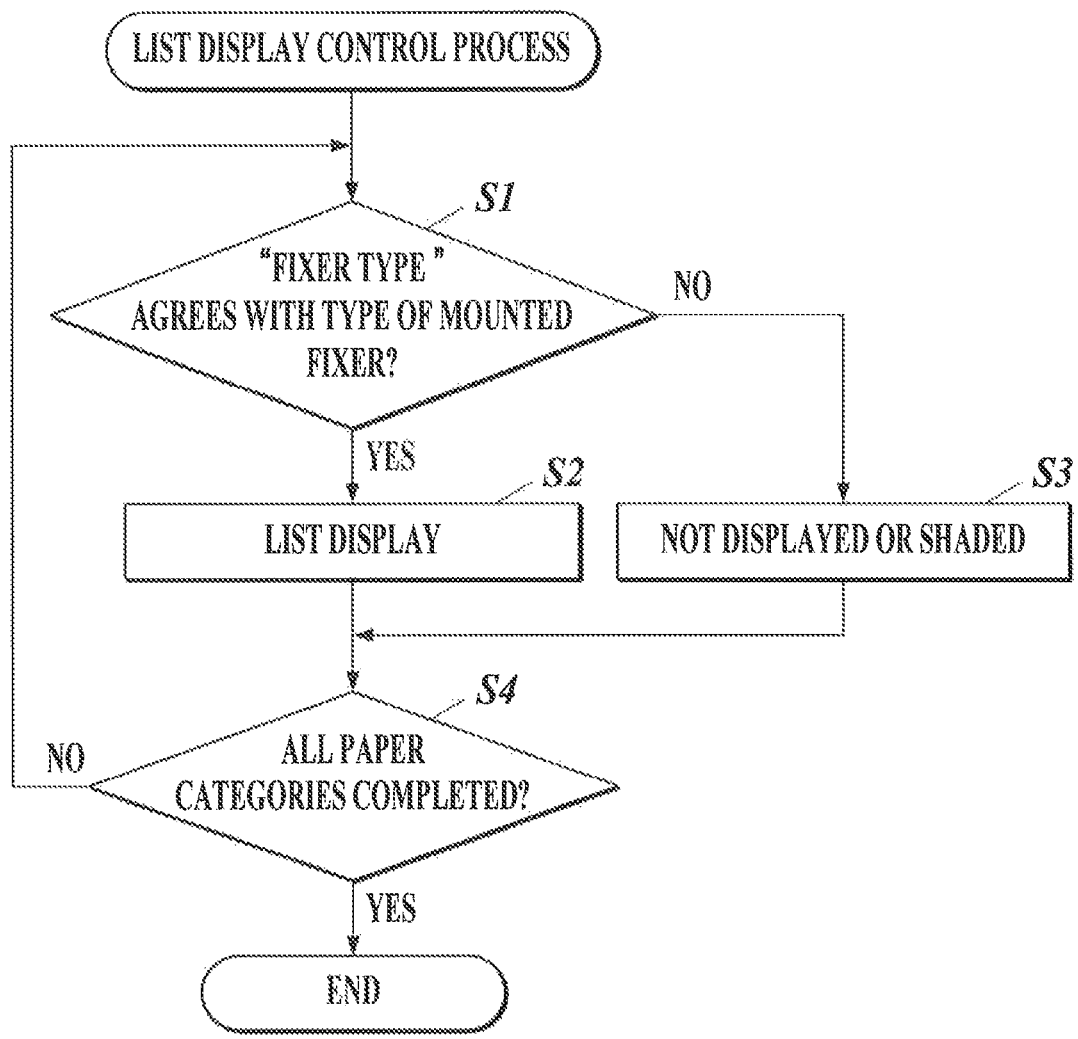
FIG. 11 is a flowchart of a list display control process performed by the controlling portion in FIG. 2.

The controlling portion 1a performs a list display control process, as shown in FIG. 11, when the paper category listing screen G2 is displayed.

At first, it is decided whether or not the "type of fixer" of the paper category agrees with a type of the fixer 19 presently mounted (step S1). The type of the mounted fixer 19 is obtained, when power is turned on, from the printer controlling portion 4b based on the fixer identification signal from the port 10a and stored in an internal memory of the controlling portion 1a.

When it is decided that the "type of fixer" of the paper category agrees with the type of the presently mounted fixer 19 (step S1; YES), information such as the "name" and "setting date" (renewal date) of the paper category and the like is displayed on the paper category listing screen G2 (step S2). When it is decided that the "type of fixer" of the paper category does not agree with the type of the presently mounted fixer 19 (step S1; NO), the information of the paper category is shaded or not displayed in the list (step S3). When the steps S1 to S3 for all of the paper categories stored in the paper category storing region A13 are ended (step S4; YES), the list display control process is completed.

In FIG. 10, for example, a paper category of the registration No. 3 is not selectable because it does not correspond to the fixer presently mounted. It becomes possible to prevent unexpected linking of a paper category not corresponding to a fixer presently mounted to a paper tray because such a paper category not corresponding to a fixer presently mounted is not selectable by virtue of the list display control process.

The non-volatile memory 1b includes a tray paper profile storing region A14 for storing tray paper profiles. The tray paper profile is setting information relating to a paper set in each of the paper trays of the paper feed portion 12 of the image formation device 10. FIG. 12 is an example of a data structure of the tray paper profiles. The "printer gamma correction mode" of the tray paper profile of a target tray, stored in the tray paper profile storing region A14, is set according to the pressed button, and the printer gamma correction system which corresponds to the pressed button is linked to the target tray. In a case where the printer gamma correction mode is set as "2", a registration number of the paper category selected from the list is set in the "link to paper category database" so as to link to the selected paper category.

(Setting of the Output Paper Density Adjustment)

The output paper density adjustment has to be in an effective state from an output paper density adjustment setup screen G3 prior to setting the output paper density adjustment.

FIG. 13 is an example of the output paper density adjustment setup screen G3. The various setting for the output paper density adjustment is performed using the output paper density adjustment setup screen G3. The output paper density adjustment setup screen G3 is displayed by a predetermined operation of the operation display portion 2.

The output paper density adjustment setup screen G3 is, as shown in FIG. 13, provided with operation buttons for setting items of "apply output paper density adjustment", "adjustment intensity", "automatic adjustment", "adjustment interval" and "cooperation with image stabilizing control".

The item "apply output paper density adjustment" is provided for selecting whether the output paper density adjustment is used or not. When "YES" button is pressed, it is set that the output paper density adjustment is applicable. When "NO" button is pressed, it is set the output paper density adjustment is not applicable. In this case, the printer gamma correction is performed by the IDC sensor system. It is set as "NO" as a default setting. When "NO" is selected, the following items are shaded and it becomes impossible to set the items.

The item "automatic adjustment" is provided for setting whether the output paper density adjustment is performed automatically or not. When the "ON" button is pressed, the output paper density adjustment is performed automatically at intervals set by the "adjustment interval". When the "OFF" button is pressed, the automatic adjustment is not performed. However, even in the "OFF" mode, manual adjustment can be performed. When the "automatic adjustment" is in the "OFF" mode, the following items are shaded and it becomes impossible to set the items.

The item "adjustment interval" is used for setting a timing of the automatic adjustment. The output paper density adjustment is automatically performed after the number of sheets are printed. The interval between adjustments can be set from 100 to 99999 sheets by pressing the button.

The item "adjustment intensity" is used to set weighing of the gamma correction of the output paper density adjustment. The adjustment intensity can be set from level 1 to 10.

The item "cooperation with image stabilizing control" is provided for setting whether the output paper density adjustment is carried out automatically or not in response to an execution of the image stabilizing control. When "YES" button is pressed, it is set such that the output paper density adjustment tied to an execution of the image stabilizing control is carried out automatically. When "NO" button is pressed, the output paper density adjustment tied to an execution of the image stabilizing control is not carried out.

The setting information set by the output paper density adjustment setup screen G3 is stored in the setting information storing region A11 of the non-volatile memory 1b. FIG. 14 shows an example of a structure of the setting information stored in the setting information storing region A11.

(Image Stabilizing Control and Output Paper Density Adjustment)

The relation between the image stabilizing control and the output paper density adjustment will be explained.

The image stabilizing control is performed so as to stabilize quality of images when environment such as temperature or humidity in the image formation device 10 was fluctuated or a developing agent was changed. Main timings the image stabilizing control is performed are the cases where:

an idling state continued 6 hours or more, predetermined number of sheets has been printed after previous image stabilizing control, temperature and humidity in the device changed 20% or more from those at the time of the previous image stabilizing control while power is on, and a developing agent was replaced.

A maximum density adjustment, surface voltage unifying correction of a photosensitive body, halftone density correction, and the like are carried out in the image stabilizing control. A developing DC bias is adjusted in the maximum density adjustment. A grid voltage is adjusted in the surface voltage unifying correction. A maximum laser power is adjusted in the halftone density correction. These adjustments of the process conditions are carried out for electrically correcting the hardware fluctuation factors. Therefore, after the image stabilizing control, it becomes necessary to regenerate gamma correction data which matches the process conditions after the adjustments.

It is necessary to generate gamma correction data for a color sensor system, that is, to perform the output paper density adjustment, a paper for the output paper density adjustment has to be set in a paper tray of the paper feed portion 12. However, there is a problem that the target paper is not set in any of the paper trays after the image stabilizing control. In addition, if the image stabilizing control is carried out during a printing job, the gamma correction chart may mingle in a printed matter of the job, which may cause pages out of order or missing and reduction of productivity. Therefore, it is not preferable for the device using the color sensor system to carry out the output paper density adjustment after the image stabilizing control, which is preferable for a device using an IDC sensor system.

In the image formation device 10 of an embodiment a registration state of the registered gamma correction data is set in a "readjustment mode" after the image stabilizing control. When executing a print job, a printer gamma automatic generating process, which will be explained below, is performed. In a case where the registration state of the gamma correction data corresponding to the fixer type used for the print job, the paper type and the screen is in the "readjustment mode", the gamma correction data will be regenerated so as to generate a gamma correction data which is conforming to the process conditions after the image stabilizing control.

(Printer Gamma Automatic Generating Process)

Figure 15B:
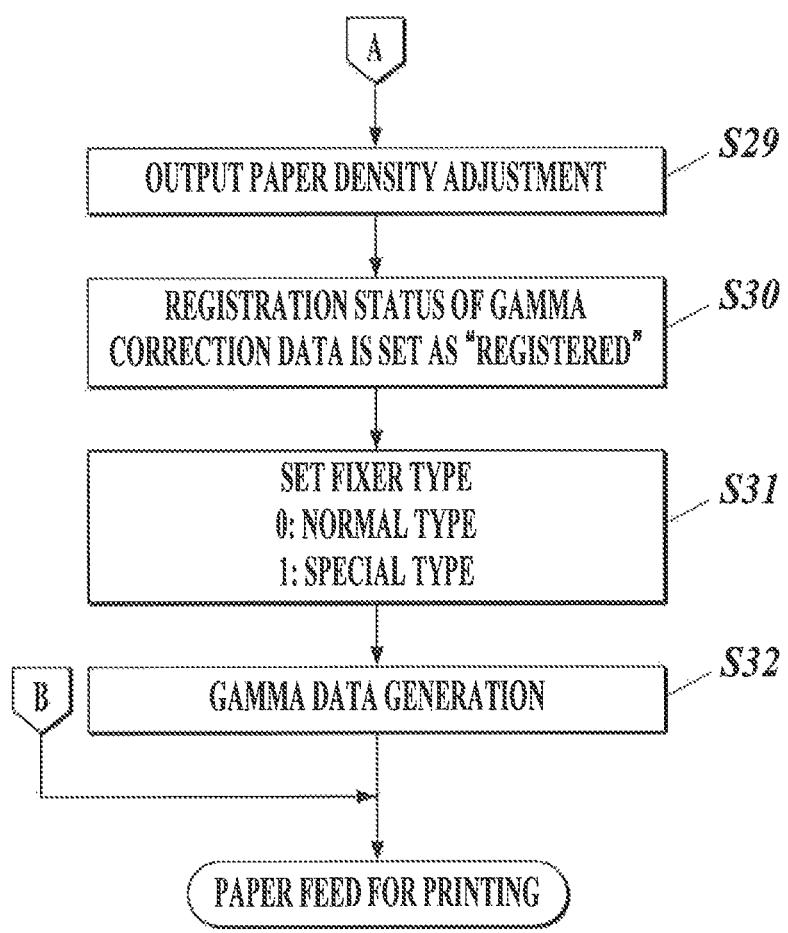
FIG. 15B is a flowchart of an automatic generation process of a printer gamma performed by the controlling portion in FIG. 2.

FIG. 15A and FIG. 15E show a flowchart of the printer gamma automatic generation process executed by the controlling portion 1a of the control substrate 1. The process is carried out, when the job printing is commanded, by the controlling portion 1a in cooperation with the programs stored in the non-volatile memory 1b along with the execution of the job.

At first paper tray used for the printing (in which paper used for the printing is set) is determined based on the job (step S21). Next, the setting information for the output paper density adjustment stored in the non-volatile memory 1b is referred to and it is decided whether or not the output paper density adjustment is set to be carried out automatically (step S22). When it is decided that the automatic output paper density adjustment is not set (step S22: NO), the process is ended and goes to a paper feed step for printing.

When it is decided that the automatic output paper density adjustment is set (step S22: YES), the tray paper profile of the paper tray for the printing job is referred to and it is decided whether or not the output paper density adjustment is to be carried out for the set paper (step S23). Specifically, when the printer gamma correction mode of the tray paper profile of the paper tray for the printing job is set as either "1: default correction value" or "2: paper category", it is decided that the output paper density adjustment for the set paper is set to be carried out.

When it is decided that the output paper density adjustment is not set to be carried out by the tray paper profile (step S23: NO), the process is ended and goes to a paper feed step for printing. When it is decided that the output paper density adjustment is set to be carried out by the tray paper profile (step S23: YES), it is decided whether or not the registration status of the gamma correction data for the combination of paper type and screen for the print job, which is stored in the non-volatile memory 1b, is either "registered" or "readjustment mode" (step S24). When it is decided that the registration status of the gamma correction data for the combination of paper type and screen for the print job is in either "registered" or "readjustment mode" (step S24: YES), the process goes to step S25. When it is decided that the registration status is not "registered" nor "readjustment mode", that is, it is "non-registered" (step S24: NO), the process goes to step S29.

At step S25, it is decided whether or not the conditions to carry out the output paper density adjustment are satisfied (step S25). For example, if the predetermined number of sheets set by the "adjustment interval" has been printed after the previous output paper density adjustment (when a difference between a value of total counter and a value of gamma correction data counter is the number set by the "adjustment interval" or more), it is decided that the conditions for the output paper density adjustment are satisfied.

When it is decided that the conditions for the output paper density adjustment are satisfied (step S25: YES), the process goes to step S28.

When it is decided that the conditions for the output paper density adjustment are not satisfied (step S25 NO), it is decided, by referring to the setting information of the output paper density adjustment stored in the non-volatile memory 1b, whether or not the output paper density adjustment is to be carried out in cooperation with the image stabilizing control (step S26). When it is decided that the output paper density adjustment is not set to be carried out in cooperation with the image stabilizing control (step S26: NO), the process is ended and goes to a paper feed-step for printing.

When it is decided that the output paper density adjustment is set to be carried out in cooperation with the image stabilizing control (step S26: YES), it is decided whether or not the registration status of the gamma correction data for the combination of paper type and screen for the print job, which is stored in the non-volatile memory 1b, is in the "readjustment mode" (step S27). When it is decided that the registration status of the gamma correction data for the combination of paper type and screen is not in the "readjustment mode" (step S27 NO), the process is ended and goes to a paper feed step for printing. When it is decided that the registration status of the gamma correction data for the combination of paper type and screen is in the "readjustment mode" (step S27: YES), the process goes to step S28.

In step S28 it is decided whether or not the "fixer type" of the gamma correction data for the combination of paper type and screen for the print job, which is stored in the non-volatile memory 1b, agrees with a type of the mounted fixer (step S28). The type of the mounted fixer is decided by referring to the internal memory of the controlling portion 1a. When it is decided that the "fixer type" of the gamma correction data for the combination of paper type and screen does not agree with the type of the mounted fixer (step S28: NO), the process is ended and goes to a paper feed step for printing.

When it is decided that the "fixer type" of the gamma correction data for the combination of paper type and screen agrees with the type of the mounted fixer (step S28: YES), the output paper density adjustment is carried out (step S29). At first a paper is fed from the paper tray used for the printing and a gamma correction chart is printed on the paper at the printing portion 4. The color of the gamma correction chart printed on the paper is then measured by the color sensor 22 and voltage values as the measured values are obtained. Next, the voltage values are converted into density values by using the paper category linked by the tray paper profile of the paper tray for the print job (when default correction values are selected, using the default correction values). The gamma correction data for the combination of the paper type and screen for the printing are replaced with the obtained density values as the sensor measurement values.

Upon completing the step of the output paper density adjustment, the registration status of the gamma correction data for the combination of the paper type and screen for the printing is changed as "registered" (step S30). And the fixer type (0: normal fixer, 1: special fixer) of the fixer presently mounted, which is stored in the internal memory, is set in the item of "fixer type" of the gamma correction data (step S31). That is, the gamma correction data and the fixer type corresponding to the gamma correction data are stored in the non-volatile memory 1b associated with each other. The gamma data is then generated based on the renewed gamma correction data (step S32) and the process comes to an end. The density values of the gamma correction data and the density values of the correction chart itself are compared with each other at step S32 and gamma data that cancel the differences between them is generated, for example. The generated gamma data is stored in the internal memory of the controlling portion 1a in relation to the gamma correction data (identification number of the gamma correction data, for example) used for the generation. After finishing of the process, based on the control of the controlling portion 1a, paper feed is started and the printer gamma correction is carried out to the image data to be printed by utilizing the gamma data generated based on the gamma correction data corresponding to the paper type (and screen type) and fixer type for printing so as to print the corrected image data on a paper at the printing portion 4.

It is possible to re-generate gamma correction data that agrees with process conditions adjusted by the manual adjustment even when the automatic adjustment of the output paper density adjustment is "OFF" or the cooperation with image stabilizing control is "OFF". A user, for example, can operate the operation display portion 2 to display an output paper density adjustment setup screen G4, as shown in FIG. 16, on the LCD 2a and carry out the output paper density adjustment process by selecting desired gamma correction data among gamma correction data displayed on the screen G4 so as to generate gamma correction data that agrees with process conditions at that time. When displaying the gamma correction data on the output paper density adjustment setup screen G4, the controlling portion 1a performs the same control as that performed in the list display control process. That is, gamma correction data that the "fixer type" agrees with the presently mounted fixer are displayed in the list and gamma correction data that the "fixer type" does not agree with the presently mounted fixer are shaded or not displayed in the list. That contributes to prevent erroneous execution of the output paper density adjustment on gamma correction data that the type of fixer does not correspond to a fixer presently mounted.

(Printer Gamma Generating Process)

In the printer gamma automatic generating process above explained, when conditions that the output paper density adjustment is necessary are satisfied at the time of printing, process conditions are changed because the image stabilizing control is executed or the like, new gamma correction data is generated by performing the automatic output paper density adjustment, gamma data is generated based on the gamma correction data and the gamma correction is performed on the image data to be printed with the generated gamma data. When printing is performed in other cases than above explained, the gamma correction is carried out using gamma data generated at turn-on the power.

Figure 17:
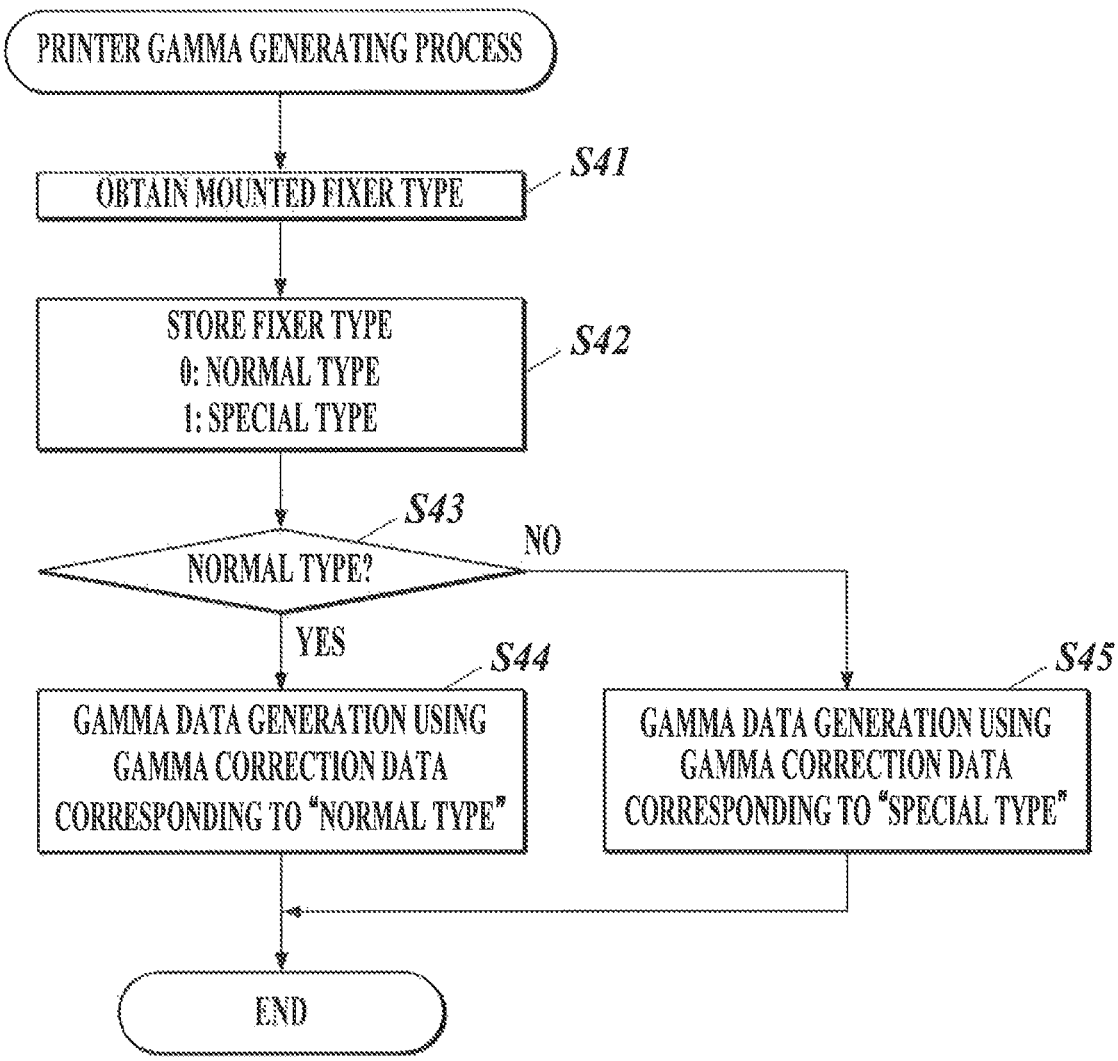
FIG. 17 is a flowchart of a printer gamma generating process performed by the controlling portion in FIG. 2.

FIG. 17 explains the printer gamma generating process performed at turn-on the power. The printer gamma generating process is performed by the controlling portion 1a in cooperation with the programs stored in the non-volatile memory 1b.

At first, information about the type of fixer 19 presently mounted is obtained through the printer controlling portion 4b (step S41).

Next, the obtained information of the fixer type (0: normal fixer, 1: special fixer) is stored in the internal memory of the controlling portion 1a (step S42).

Next, it is decided whether a fixer 19 presently mounted is a normal fixer 191 or not based on the fixer type information stored in the internal memory (step S43). When it is decided that the fixer 19 presently mounted is a normal fixer 191 (step S43: YES), gamma data is generated by utilizing the gamma correction data corresponding to the "fixer type" of "0: normal fixer" among gamma correction data stored in the gamma correction data storing region A2 of the non-volatile memory 1b, the generated gamma data is stored in the internal memory (step S44) and the printer gamma generating process comes to an end. The generated gamma data is stored in the internal memory of the controlling portion 1a such that the gamma data is associated with the gamma correction data (identification number of the gamma correction data, for example) used for the generation.

On the other hand, when it is decided that the fixer 19 presently mounted is not a normal fixer 191 but a special fixer 192 (step S43: NO), gamma data is generated by utilizing the gamma correction data corresponding to the "fixer type" of "1: special fixer" among gamma correction data stored in the gamma correction data storing region A2 of the non-volatile memory 1b, the generated gamma data is stored in the internal memory (step S45) and the printer gamma generating process comes to an end. The generated gamma data is stored in the internal memory of the controlling portion 1a such that the gamma data is associated with the gamma correction data (identification number of the gamma correction data, for example) used for the generation.

As explained above, two kinds of fixers, normal fixer 191 or special fixer 192, can be mounted on the image formation device 10. Therefore, according to a job, a user may turn off the power, replace the fixer 19 and turn on again to execute printing. When the fixer 19 is replaced, gamma data have to be generated based on gamma correction data that corresponds to characteristics of the replaced fixer. Conventionally, the output paper density adjustment was carried out, every time the fixer 19 was replaced, to generate gamma correction data corresponding to characteristics of the mounted fixer 19 and gamma data was generated using the generated gamma correction data. However, the process required much time and costs.

Thus, as explained above, according to the image formation device 10 of an exemplary embodiment, gamma correction data and a type of fixer mounted when the gamma correction data is generated are stored associated with each other in a non-volatile memory 1b. The printer gamma generating process is carried out as above explained at power-on, in which gamma correction data corresponding to a mounted fixer is determined among gamma correction data stored in the non-volatile memory 1b and gamma data is generated based on the determined gamma correction data. As a result, it becomes not necessary to carry out the output paper density adjustment every time a unit (fixer) is replaced and troublesome steps and costs with the replacement can be greatly reduced.

According to the image formation device 10 of an exemplary embodiment, as explained above, the controlling portion 1a reads a gamma correction chart printed on a paper by the color sensor 22 and generates gamma correction data. The generated gamma correction data is stored in the non-volatile memory 1b such that the gamma correction data is associated with at least a type of fixer and a type of the paper used for printing the gamma correction chart.

As a result, because gamma correction data corresponding to the type of a mounted fixer can be read from the non-volatile memory 1b and used for the printer gamma correction, it becomes not necessary to generate gamma correction data that was necessary when a fixer was replaced and thus it becomes possible to reduce greatly the work and time necessary at a replacement of a fixer.

The controlling portion 1a reads gamma correction data corresponding to the type of fixer identified by the port 19a from the non-volatile memory 1b at power-on, generates gamma data defining a relation between the input image and the output image at the printing portion 4 by the use of the gamma correction data and stores the gamma data in the internal memory. When printing, the controlling portion performs the printer gamma correction on the image data to be printed using the gamma data corresponding to the type of paper and the type of fixer used for the printing. Therefore, even when the fixer was replaced, the printer gamma correction can be performed on image data to be printed by using gamma correction data corresponding to the type of the replaced fixer and thus it becomes possible to reduce greatly the work and time necessary to replace a fixer.

When replacing a fixer by the reason of the end of its useful life, for example, there may be a case where a type of fixer before and after replacement of the fixer is not changed. In such a case, gamma data is generated using the same gamma correction data even after the replacement because the fixing process characteristics are not changed so much.

The controlling portion 1a controls, when displaying a list of the paper category or gamma correction data, so as not to display or so as to shade paper category or gamma correction data which do not correspond to a fixer type which is presently mounted. Therefore, it can be prevented that a user may select gamma correction data from the list accidentally which does not correspond to the mounted fixer.

The explanation of the exemplary embodiment is a mere example of an image formation device of the present invention and not intended to limit the invention to the embodiment.

In the above exemplary embodiment, for example, a registration status of gamma correction data is set as "readjustment mode" after stabilizing control and output paper density adjustment is performed and gamma correction data is generated in a case where the registration status of gamma correction data corresponding to paper type and screen used for printing is in the "readjustment mode" at a time of printing. However, it will be possible to renew gamma correction data corresponding to a type of mounted fixer subsequent to the stabilizing control and generate gamma data.

The above exemplary embodiment assumes that there are a normal fixer and a special fixer (for envelopes) that can be replaced; however, the present invention is not limited to that. The present invention can be applied to an image formation device which a fixer can be replaceable according to a paper size.

The above exemplary embodiment assumes that the gamma correction data is stored in the non-volatile memory 1b in the main portion 11. However, it may be possible to structure such that each of the normal fixer 191 and the special fixer 192 is provided with a memory medium such as a non-volatile memory and generated gamma correction data may be stored in the memory medium for the fixer 19 used at a time of generating the gamma correction data at a time of generating the gamma correction chart).

In the above exemplary embodiment, a ROM, hard disc or a non-volatile memory was used as an example of a computer readable medium for a program of the present invention. However, the invention is not limited to the examples. For example, a portable record memory such as a CD-ROM may be used as a computer readable medium. Furthermore, carrier wave may be used as a medium for providing program data of the invention through a communication line.

In addition, the detailed structures and operations of each of the portions may be modified and or combined within the gist of the present invention.

The present U.S. application claims a priority under the Paris Convention of Japanese Patent Application No. 2011-230230 filed on Oct. 20, 2011, the disclosure of which is incorporated by reference in its entirety.

What is claimed is:

1. An image formation device comprising:
    a printing portion containing a detachable fixer,
    a fixer identification portion which identifies a type of fixer mounted on the image formation device,
    a sensor which reads an image printed on a paper by the printing portion,
    gamma correction data generating portion which generates gamma correction data by reading a gamma correction chart printed on a paper by the printing portion and stores the generated gamma correction data in a memory medium such that the gamma correction data is associated with a type of the fixer and a type of the paper that are used for printing the gamma correction chart, and
    a printer gamma correction portion which performs printer gamma correction on an image data to be printed based on the gamma correction data stored in the memory medium corresponding to the paper type and the fixer type used for printing.

2. The image formation device according to claim 1, further comprising:
    a gamma data generating portion which reads the gamma correction data corresponding to the identified fixer from the memory medium, upon identifying the type of the fixer mounted on the image formation device by the fixer identification portion, and generates gamma data defining a relation between an input image and an output image at the printing portion by utilizing the gamma correction data read from the memory medium, wherein;
    the printer gamma correction portion performs gamma correction on the image data to be printed by utilizing the gamma data generated by the gamma data generating portion based on the gamma correction data corresponding to the paper type and the fixer type used for printing.

3. The image formation device according to claim 1, further comprising:
    a display portion, and
    a display controlling portion which controls to display a list of the gamma correction data stored in the memory medium on the display portion, wherein;
    the display controlling portion controls such that the gamma correction data corresponding to a fixer type that is different from a fixer type of the fixer that is presently mounted on the image formation device is shaded or not displayed in the list.

4. The image formation device according to claim 2, further comprising:
    a display portion, and
    a display controlling portion which controls to display a list of the gamma correction data stored in the memory medium on the display portion, wherein;
    the display controlling portion controls such that the gamma correction data corresponding to a fixer type that is different from a fixer type of the fixer that is presently mounted on the image formation device is shaded or not displayed in the list.

* * * * *